United States Patent
Cummings, III et al.

(10) Patent No.: US 9,458,768 B2
(45) Date of Patent: Oct. 4, 2016

(54) ALGAE-DERIVED FUEL/WATER EMULSION

(71) Applicant: Rolls-Royce Corporation, Indianapolis, IN (US)

(72) Inventors: William G. Cummings, III, Indianapolis, IN (US); Enrico Lo Gatto, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 369 days.

(21) Appl. No.: 14/142,173

(22) Filed: Dec. 27, 2013

(65) Prior Publication Data

US 2014/0260304 A1 Sep. 18, 2014

Related U.S. Application Data

(60) Provisional application No. 61/786,083, filed on Mar. 14, 2013.

(51) Int. Cl.
*F02C 7/22* (2006.01)
*C10L 1/32* (2006.01)
*C10L 5/44* (2006.01)

(52) U.S. Cl.
CPC .................. *F02C 7/22* (2013.01); *C10L 1/328* (2013.01); *C10L 5/44* (2013.01); *C10L 5/445* (2013.01); *C10L 2200/0469* (2013.01); *C10L 2250/084* (2013.01); *C10L 2270/04* (2013.01); *Y02E 50/10* (2013.01); *Y02E 50/30* (2013.01); *Y02T 50/678* (2013.01)

(58) Field of Classification Search
CPC .............. F02C 3/20; F02C 3/22; F02C 3/30; Y02E 50/10; Y02E 50/30; Y02E 50/343; Y02E 50/678; C10L 5/44; C10L 2200/0469; C10L 2270/04

See application file for complete search history.

(56) References Cited

U.S. PATENT DOCUMENTS

| 6,663,680 B1 | 12/2003 | Dodd et al. |
| 6,858,046 B2 | 2/2005 | Daly et al. |
| 7,276,093 B1 | 10/2007 | Rivas et al. |

(Continued)

FOREIGN PATENT DOCUMENTS

| WO | 9219701 A1 | 11/1992 |
| WO | WO 92/19701 A1 | 11/1992 |

(Continued)

OTHER PUBLICATIONS

International Search Report and Written Opinion issued to International Patent Application No. PCT/US2013/076524, mailed Jun. 17, 2014, 15 pages.

(Continued)

*Primary Examiner* — Arun Goyal
(74) *Attorney, Agent, or Firm* — Barnes & Thornburg LLP

(57) ABSTRACT

A method including providing a wet algae material having been subjected to a refinement process without a water separation phase; supplying the wet algae material including a water fraction and an algae-grown biofuel to a turbine engine; and operating the turbine engine with the wet algae material where a retained portion of the water fraction is retained in the wet biofuel during a manufacturing process not including a dehydration step and includes an amount sufficient to reduce generation of a quantity of nitrogen oxides, and where the turbine engine can further include a combustor capable of combusting the wet biofuel.

8 Claims, 3 Drawing Sheets

(56) References Cited

U.S. PATENT DOCUMENTS

| | | |
|---|---|---|
| 7,444,987 B2 | 11/2008 | Cohn et al. |
| 7,491,247 B1 | 2/2009 | Jakush et al. |
| 2008/0115500 A1* | 5/2008 | MacAdam ............... F02C 3/20 60/772 |
| 2008/0160593 A1 | 7/2008 | Oyler |
| 2008/0282604 A1 | 11/2008 | Awang et al. |
| 2009/0031615 A1 | 2/2009 | Joshi et al. |
| 2009/0081748 A1 | 3/2009 | Oyler |
| 2009/0126260 A1 | 5/2009 | Aravanis et al. |
| 2009/0151231 A1 | 6/2009 | Lee et al. |
| 2009/0260278 A1 | 10/2009 | Klausmeier |
| 2009/0272119 A1 | 11/2009 | Ryder |
| 2010/0011778 A1 | 1/2010 | Knight et al. |
| 2010/0037513 A1 | 2/2010 | Petrucci et al. |
| 2010/0269514 A1 | 10/2010 | Fullton, III |
| 2011/0167713 A1 | 7/2011 | Quignard et al. |
| 2013/0137154 A1* | 5/2013 | Reep ..................... C10L 1/1802 435/168 |

FOREIGN PATENT DOCUMENTS

| | | |
|---|---|---|
| WO | 9307238 A1 | 4/1993 |
| WO | WO 93/07238 A1 | 4/1993 |

OTHER PUBLICATIONS

International Search Report and Written Opinion for International Application No. PCT/US2013/076524, search completed Mar. 6, 2014, 14 pages.

* cited by examiner

ALGAE-DERIVED FUEL/WATER EMULSION

CROSS-REFERENCE TO RELATED APPLICATIONS

This application claims priority to U.S. Provisional Application Ser. No. 61/786,083, entitled "Algae-Derived Fuel/Water Emulsion," filed Mar. 14, 2013, which is incorporated herein by reference in its entirety.

TECHNICAL FIELD

The present invention generally relates to algae-derived biofuel, and more particularly, but not exclusively, to algae-derived fuel/water emulsions.

BACKGROUND

Present approaches to algae-derived biofuel suffer from a variety of drawbacks, limitations, disadvantages and problems including those respecting processing time, cost, energy and others. There is a need for the unique and inventive algae-derived fuel/water emulsion apparatuses, systems and methods disclosed herein.

SUMMARY

One embodiment of the present invention is a unique algae-derived fuel/water emulsion. Other embodiments include apparatuses, systems, devices, hardware, methods, and combinations for algae-derived fuel/water emulsions. Further embodiments, forms, features, aspects, benefits, and advantages of the present application shall become apparent from the description and figures provided herewith.

DETAILED DESCRIPTION

Figure 1:
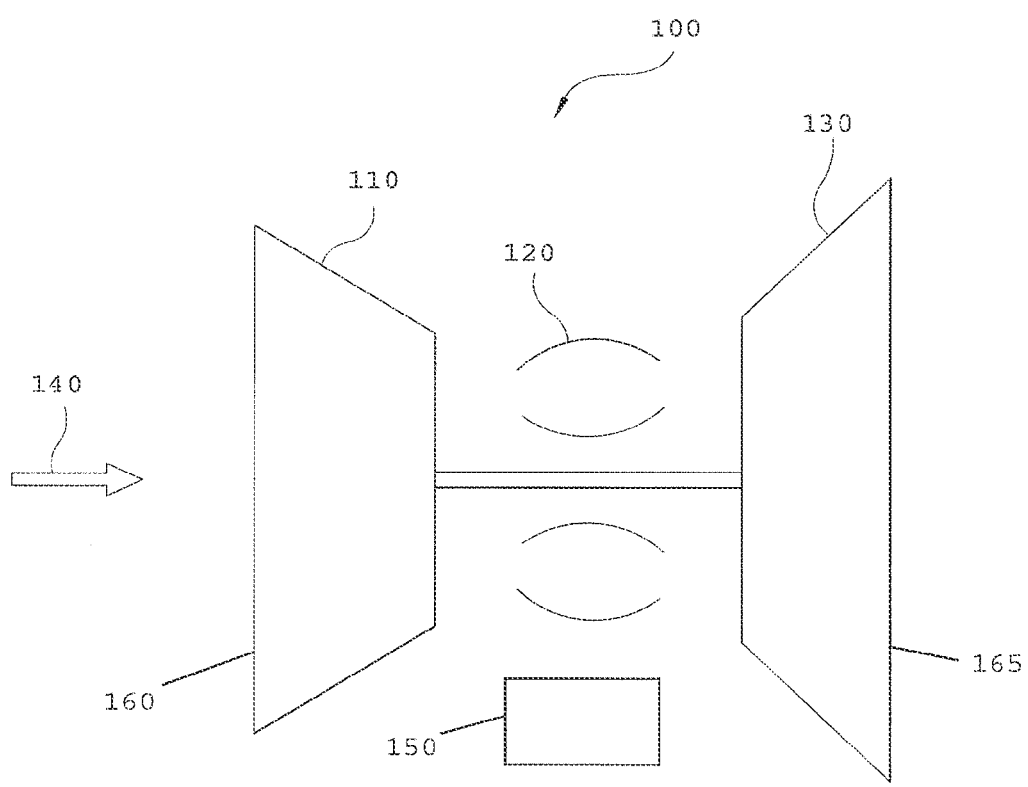
FIG. 1 is a schematic diagram of a gas turbine system including an embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 100 is shown including a compressor 110, a combustor 120, a turbine 130, and a fuel source 150. Gas turbine engine 100 can provide energy as part of an electrical generator set in some forms, and/or in other forms may provide power to an aircraft or marine application. As used herein, the term "aircraft" includes, but is not limited to, helicopters, airplanes, unmanned space vehicles, fixed wing vehicles, variable wing vehicles, rotary wing vehicles, hover crafts, and other airborne and/or extraterrestrial vehicles. Further, the present inventions are contemplated for utilization in other applications that may not be coupled with an aircraft such as, for example, industrial applications, power generation, pumping sets, naval propulsion weapons systems, security systems, perimeter defense/security systems, and the like known to one of ordinary skill in the art.

For gas turbine engine 100 as shown in FIG. 1, an airflow 140 enters compressor 110 whereupon it is compressed and passed to combustor 120 to be mixed with fuel from fuel source 150 and burned. The products of combustion produced from a combustion event exit combustor 120 and are passed to turbine 130 before exiting gas turbine engine 100. Though gas turbine engine 100 is shown as a single-spool, axial flow engine, other engine types and configurations are also possible. In one non-limiting example, compressor 110 can include a high pressure and low pressure compressor, and in some forms may include a mixed axial/centrifugal flow compressor sections. Gas turbine engine 100 can be an adaptive cycle or variable cycle engine. Furthermore, in some embodiments, gas turbine engine 100 can take the form of a turbofan, turboprop, turbojet, or turboshaft engine suitable for use as a power plant at a variety of operating conditions. Other variations and combinations of gas turbine engine 100 are also contemplated herein.

Gas turbine engine 100 operates by receiving working fluid through an inlet 160 of gas turbine engine 100 and discharging working fluid through an outlet 165, which typically includes combustion exhaust. Airflow 140 entering inlet 160 of gas turbine engine 100 flows through compressor 110, combustor 120, and turbine 130 before exiting at outlet 165 of gas turbine engine 100. Upon traversing gas turbine engine 100, airflow 140 is expanded through turbine 130 thereby creating mechanical work to drive compressor 110, an output shaft connected to a rotating machine, and/or to provide thrust for an aircraft, to set forth just a few non-limiting examples.

Figure 2:
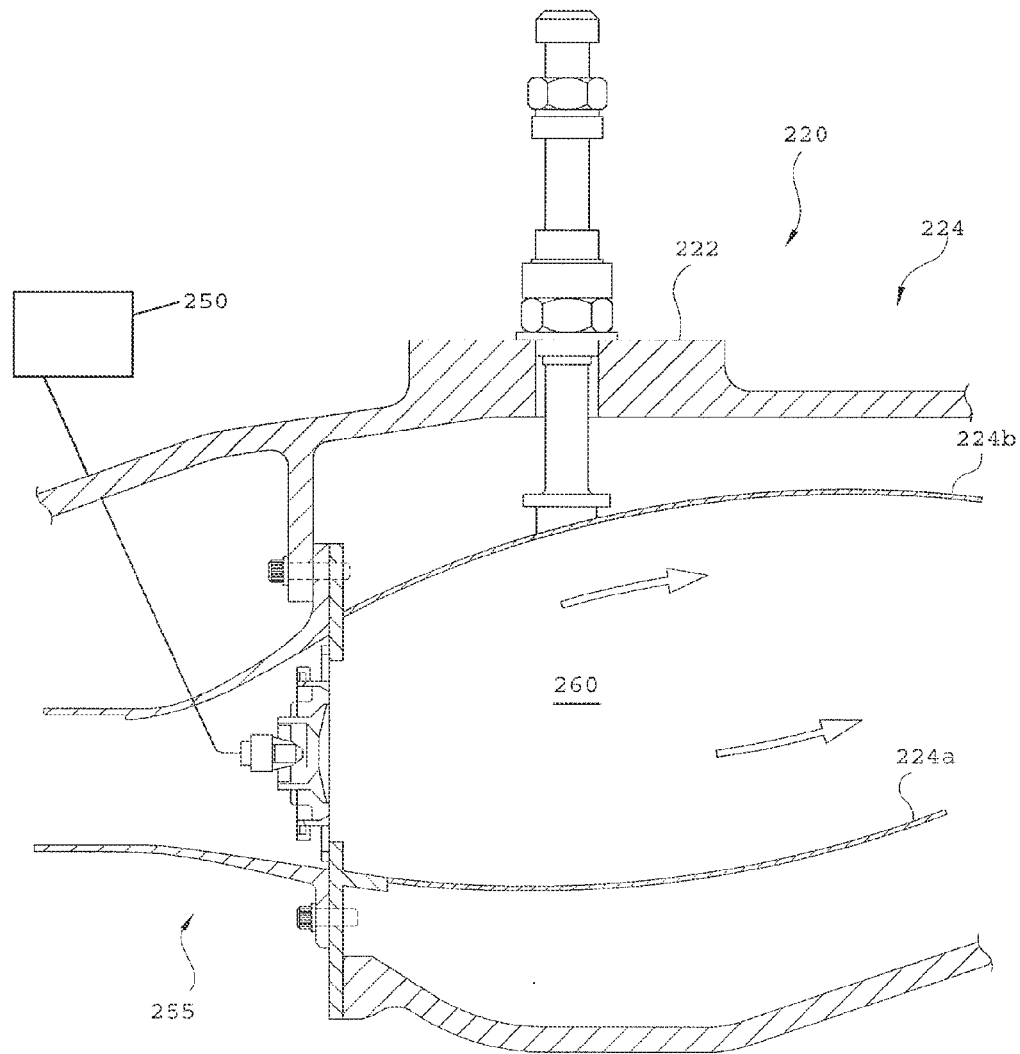
FIG. 2 is a schematic diagram of a portion of a gas turbine system including an embodiment of the present application.

Turning now to FIG. 2, one form of a combustor 220 is shown. Combustor 220 of the illustrated embodiment is sometimes referred to as an annular combustor. In other embodiments, however, combustor 220 can take different forms such as a can/tubular combustor or a can-annular combustor. Furthermore, combustor 220 can be a straight-through flow combustor, as illustrated, or a reverse flow combustor. Combustor 220 includes a casing 222, a liner 224, and a fuel nozzle 255, but in other embodiments can include fewer or additional components. Casing 222 provides a region within which combustion occurs after air is mixed with fuel provide by fuel nozzle 255. Liner 224 includes an inner combustor liner wall 224a and an outer combustor liner wall 224b that together at least partially define a combustion zone 260. Compressed air from a compressor (not shown) is mixed with fuel from fuel nozzle 255 and burned between inner combustor liner wall 224a and outer combustor liner wall 224b in combustion zone 260.

Fuel nozzle 255 can take a variety of forms other than that depicted in the illustrative embodiment. In some forms fuel nozzle 255 can include internal air and fuel passages, air swirlers, and fuel filmers, among others. Fuel nozzle 255 can take the form of an air blast atomizer, among other types. A fuel source 250 supplies fuel to fuel nozzle 255. The fuel is supplied for combustion and can be mixed with air prior to combustion. Fuel and air mixing configurations can vary as understood by one skilled in the art. The high pressure air from the compressor is heated by the combustion taking place in the combustor at a constant pressure and then fed to the turbine to produce the mechanical rotation energy of the turbine.

Fuel source 250 in FIG. 2 includes a biofuel containing a portion of water. In a specific embodiment, the water/fuel mixture can be an emulsion. In another embodiment, a wet hydrocarbon biofuel from fuel source 250 can be supplied to the combustor through fuel nozzle 255. A water component can thereby be injected into the combustor through the same supply system as the fuel to provide a low flame temperature combustion reaction including fuel and water. Because water is already mixed with the biofuel emulsion, additional water injected into the combustor is not required. This eliminates the need to have separate water injection hardware or a water source for applications needing water addition for the combustion process. In one embodiment, a common injection system can provide improved fuel and water mixing in the combustion system.

In an embodiment of the present application, the portion of water in the wet hydrocarbon biofuel is retained from the water by-product of the biofuel production process. Manufacturing processes for producing biofuel from an algae-derived biomass can include water from sources such as an algae pool and as a product of a transesterification of algae oil, to name a few. At least a portion of the water by-product is not separated out from the biofuel product which, in some embodiments, can be unrefined or partially refined biofuel. In other embodiments, the manufacturing process can be without a separation of water and fuel step or with a reduced dewatering step.

Figure 3:
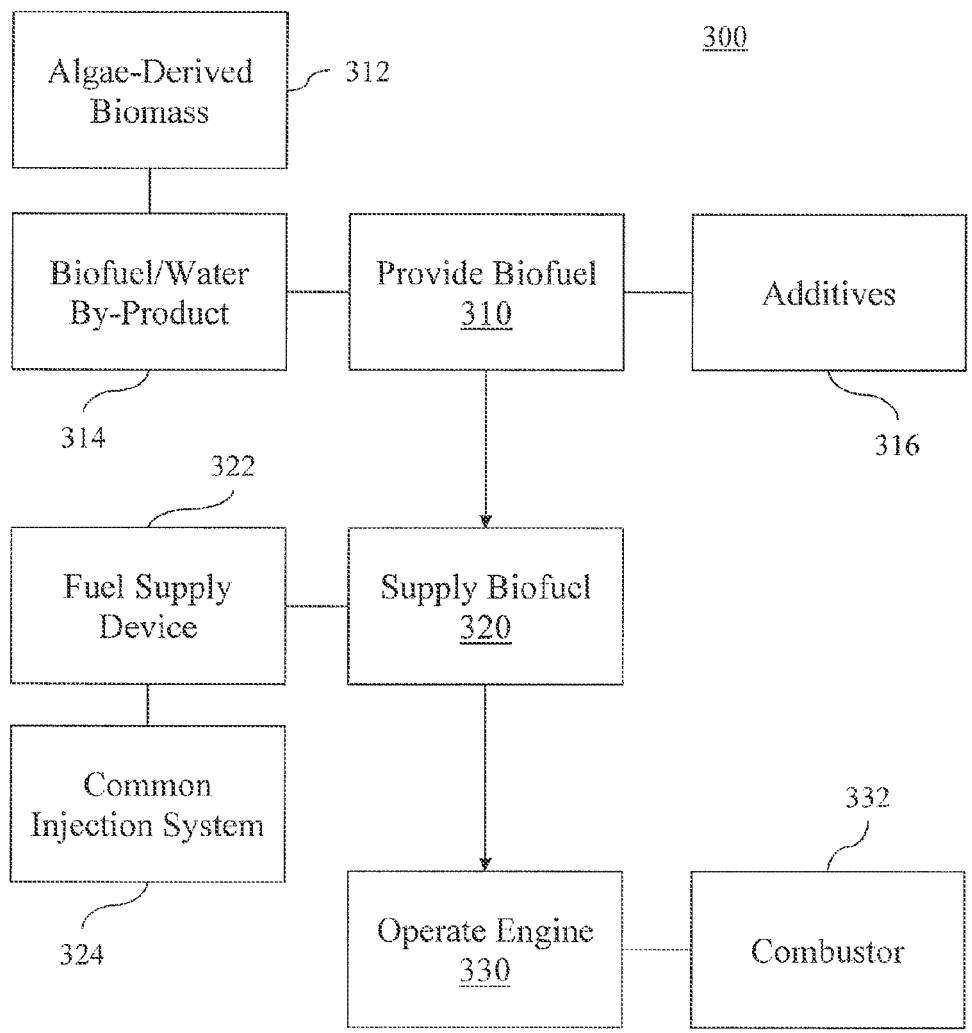
FIG. 3 is a flow diagram of one embodiment of the present application.

In FIG. 3, a process 300 is shown for operating a gas turbine engine. Operation 310 provides a biofuel to the gas turbine engine. The biofuel of operation 310 can include a biofuel produced from an algae-derived biomass 312 in a process which produces a biofuel and water component mixture 314. In one embodiment for this process, at least a portion of the water component from a biofuel manufacturing process is retained in an emulsion with the biofuel. In another embodiment, operation 310 provides a wet biofuel which includes a water/fuel emulsion formed by a water phase retained during a manufacturing process and an algae-grown biofuel. In yet another embodiment, operation 310 can include a biofuel manufacturing process without a water/fuel separation step thereby retaining at least a portion of the water phase. In other embodiments, the wet biofuel can also include additives 316 such as, but not limited to, an antifreeze, a surfactant, an emulsifier, an ion exchange material, and combinations of these.

The wet biofuel provided in operation 310 is supplied in operation 320 to the gas turbine engine with a fuel supply device 322. In one embodiment, fuel supply device 322 can include a common injection system 324 as the biofuel and the water are in emulsion. Following the supplying of wet biofuel in operation 320 is operation 330 where the gas turbine engine is operated when fueled by the wet biofuel. In one embodiment, the gas turbine engine is operated when the supplied wet biofuel participates in a combustion reaction in a combustor region of the gas turbine engine. As air, usually compressed by a compressor, is supplied to the combustor region, oxygen in the air aids in fueling the combustion reaction of the wet biofuel. In various embodiments, the wet biofuel is supplied to the combustor portion of the gas turbine engine to maintain a combustion state adequate to operate the gas turbine engine.

Biofuel can be considered a drop-in fuel allowing gas turbine engine equipment to remain relatively the same as for conventional fuel burning equipment. In other embodiments of the present application, a wet biofuel can introduce water to the combustion reaction. Water in a combustion reaction can contribute to thermal management of the gas turbine engine. In one embodiment, the retained portion of the water includes an amount sufficient to produce a combustion reaction which reduces generation of nitrogen oxides. Water in the combustion can produce a low flame temperature which can reduce the generation of nitrogen oxides. In another embodiment, the retained portion of the water includes an amount sufficient to produce a combustion reaction which reduces an operating temperature of the gas turbine engine. The operating temperature can be, for example, a turbine inlet temperature which can be reduced in response to the heat absorption of the water in the wet biofuel.

One aspect of the present application includes a method which provides a wet algae material having been subjected to a refinement process without a water separation phase; supplies the wet algae material including a water fraction and an algae-grown biofuel to a turbine engine; and operates the turbine engine with the wet algae material where operating the turbine engine can further include combusting the wet biofuel in a combustor of the turbine engine. Further aspects can include providing the wet algae material by processing an algae-derived biomass to retain a retained portion of the water fraction; processing the algae-derived biomass by producing a water/fuel emulsion from the retained portion of the water fraction and the wet algae material. Another feature of this aspect can include reducing a generation of a quantity of nitrogen oxides in a combustion process with a determined amount of the retained portion of the water fraction and reducing an operating temperature in a combustion process with a determined amount of the retained portion of the water fraction.

Another aspect of the present application is a system including a turbine engine capable of operating with a wet hydrocarbon fuel; a source of the wet hydrocarbon fuel having been subjected to a hydro-cracking process in the absence of a water separation stage and having a water component; and a supply device structured to deliver the wet hydrocarbon fuel from the source to the turbine engine where the wet hydrocarbon fuel having the water component is a water/fuel emulsion; an unrefined algae-grown hydrocarbon fuel; an algae-grown biofuel; and/or further includes an additive from a group consisting of an antifreeze, a surfactant, an emulsifier, an ion exchange resin, and combinations thereof.

Further features of this aspect can include the wet hydrocarbon fuel having at least a portion of water component retained in the wet hydrocarbon fuel during a manufacturing process where the manufacturing process does not include a separation of water and fuel step or a dehydration step, where the portion of water component includes an amount sufficient to reduce generation of a quantity of nitrogen oxides produced by the turbine engine or an amount sufficient to reduce an operating temperature of the turbine engine. Still further features can include the turbine engine having a combustor capable of combusting the wet hydrocarbon fuel and the supply device having a supply line and a common injection device for the wet hydrocarbon fuel having the water component.

Yet another aspect of the present application is a method including providing a wet biofuel including an algae-grown biofuel and at least a portion of a water phase; supplying the wet biofuel with a source supply device structured to deliver the wet biofuel to a turbine engine; and operating the turbine engine with the wet biofuel where providing the wet biofuel further includes retaining the portion of the water phase in the wet biofuel during a manufacturing process without a dewatering step, where providing the wet biofuel further includes reducing a generation of a quantity of nitrogen oxides when operating the turbine engine with a determined amount of the portion of the water phase, and where the turbine engine can further include a combustor capable of combusting the wet biofuel.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   providing a wet algae material having been subjected to a refinement process without a water separation phase;
   supplying a wet biofuel consisting of the wet algae material including a water fraction and an algae-grown biofuel as an emulsion to a gas turbine engine; and
   operating the gas turbine engine with the wet biofuel,
   wherein operating the gas turbine engine further includes combusting the wet biofuel in a combustor of the gas turbine engine.

2. The method of claim 1, wherein providing the wet algae material further includes processing an algae-derived biomass to retain a retained portion of the water fraction.

3. The method of claim 2, wherein said processing the algae-derived biomass further includes producing a water/fuel emulsion of the retained portion of the water fraction and the wet algae material.

4. The method of claim 2, wherein said processing the algae-derived biomass further include reducing a generation of a quantity of nitrogen oxides in a combustion process with a determined amount of the retained portion of the water fraction.

5. The method of claim 2, wherein said processing the algae-derived biomass further include reducing an operating temperature in a combustion process with a determined amount of the retained portion of the water fraction.

6. A method comprising:
   processing a wet algae material having been subjected to a refinement process without a water separation phase;
   providing a wet biofuel including an algae-grown biofuel and the wet algae material having at least a portion of a water phase;
   supplying the wet biofuel as an emulsion with a source supply device structured to deliver the wet biofuel to a gas turbine engine; and
   operating the gas turbine engine with the wet biofuel, and
   wherein said providing the wet biofuel further includes reducing a generation of a quantity of nitrogen oxides in said operating the gas turbine engine with a determined amount of the portion of the water phase, and wherein the operating the gas turbine engine further includes combusting the wet biofuel in a combustor of the gas turbine engine.

7. The system of claim 6, wherein the wet biofuel further includes an additive from a group consisting of an antifreeze, a surfactant, an emulsifier, an ion exchange resin, and combinations thereof.

8. The system of claim 6, wherein the manufacturing process does not include a dehydration step.

* * * * *